US010367631B2

(12) United States Patent
Chapman et al.

(10) Patent No.: US 10,367,631 B2
(45) Date of Patent: Jul. 30, 2019

(54) FRONT END FOR FULL DUPLEX CABLE MODEM

(71) Applicant: CISCO TECHNOLOGY, INC., San Jose, CA (US)

(72) Inventors: John T. Chapman, Coto de Caza, CA (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 22 days.

(21) Appl. No.: 15/648,309

(22) Filed: Jul. 12, 2017

(65) Prior Publication Data
US 2018/0205532 A1 Jul. 19, 2018

Related U.S. Application Data

(60) Provisional application No. 62/447,148, filed on Jan. 17, 2017.

(51) Int. Cl.
*H04B 3/21* (2006.01)
*H04B 3/23* (2006.01)
(Continued)

(52) U.S. Cl.
CPC ............ *H04L 5/143* (2013.01); *H04B 3/21* (2013.01); *H04B 3/23* (2013.01); *H04L 5/1461* (2013.01);
(Continued)

(58) Field of Classification Search
CPC .. H04B 1/10–14; H04B 1/7097–71075; H04B 2001/71077; H04B 3/20–34;
(Continued)

(56) References Cited

U.S. PATENT DOCUMENTS

| 6,795,494 B1* | 9/2004 | Phanse | H04L 25/45 375/219 |
| 2017/0019146 A1 | 1/2017 | Jin et al. | |
| 2018/0159588 A1* | 6/2018 | Williams | H04B 3/235 370/286 |

FOREIGN PATENT DOCUMENTS

| WO | 2014074979 A1 | 5/2014 | |
| WO | WO-2014074979 A1 * | 5/2014 | .......... H04N 21/615 |

OTHER PUBLICATIONS

European Extended Search Report dated Dec. 19, 2017 cited in Application No. 17183152.2, 7 pgs.
(Continued)

*Primary Examiner* — Timothy J Weidner
(74) *Attorney, Agent, or Firm* — Merchant & Gould P.C.

(57) ABSTRACT

Designs for a front end for suppressing adjacent channel interference (ACI) and adjacent leakage interference (ALI) in a full duplex cable modem (CM) for a Data Over Cable Service Interface Specification ("DOCSIS") network are described. The CM includes an upstream (US) signal path receiving a digital US input signal and transmitting an analog-converted US signal in a US frequency range to a cable modem termination system (CMTS); a downstream (DS) signal path receiving an analog DS signal in a DS frequency range and converting the analog DS signal into a digital DS signal; and an echo cancellation (EC) circuit configured to subtract, from at least one of the analog DS signal and the digital DS signal, a correction signal generated from the digital US input signal or a correction signal generated from the analog-converted US signal to generate an echo-cancelled digital DS input signal without ACI and ALI.

20 Claims, 15 Drawing Sheets

(51) Int. Cl.
*H04L 5/14* (2006.01)
*H04L 12/28* (2006.01)
*H04L 25/08* (2006.01)
*H04L 27/12* (2006.01)
*H04L 27/148* (2006.01)

(52) U.S. Cl.
CPC .......... *H04L 12/2801* (2013.01); *H04L 25/08* (2013.01); *H04L 27/122* (2013.01); *H04L 27/148* (2013.01)

(58) Field of Classification Search
CPC .............. H04B 3/46–493; H04B 7/015; H04B 15/005–06; H04B 2215/061–069; H04J 1/02–05; H04J 1/10–12; H04J 1/16; H04J 11/0023–0066; H04L 5/143; H04L 5/1461; H04L 12/2801; H04L 25/0328; H04L 25/08–085; H04L 27/0002–389; H04L 2027/0016–0097; H04L 41/24–26; H04L 43/12; H04N 21/6118; H04N 21/6168
See application file for complete search history.

(56) References Cited

OTHER PUBLICATIONS

Lee, et al., "A 125mhz Mixed Signal Echo Canceller for Gigabit Ethernet on Copper Wire," IEEE Journal of Solid State Circuit, vol. 36, Mar. 2001, 8 pages; https://pdfs.semanticscholar.org/f0cb/444f94af2afcde3b9b4449cce863cfa248dc.pdf.

Hong, S., et al., "Applications of Self-Interference Cancellation in 5G and Beyond," IEEE Communications Magazine, Feb. 2014, 8 pages; http://on5vl.e-monsite.com/medias/files/commmag14-5g.pdf.

"DOCIS® 3.1 Physical & MAC Layer Quick Reference Pocket Guide," CableLabs, Cable Television Laboratories, Inc., Sep. 19, 2014, 202 pages.

"Echo Cancellation," Tellabs, Copyright © 2014 The International Engineering Consortium, 16 pages; http://www.iec.org/.

* cited by examiner

FRONT END FOR FULL DUPLEX CABLE MODEM

CROSS-REFERENCE TO RELATED APPLICATION

This application claims the benefit of priority under 35 U.S.C. § 119(e) to U.S. Provisional Application Ser. No. 62/447,148 entitled "FRONT END FOR FULL DUPLEX CABLE MODEM," filed Jan. 17, 2017, which is hereby incorporated by reference in its entirety.

TECHNICAL FIELD

This disclosure relates in general to the field of communications networks and, more particularly, to a design for a front end for implementing a full duplex (FDX) cable modem (CM) for a Data Over Cable Service Interface Specification ("DOCSIS") network.

BACKGROUND

Consumer appetite for bandwidth continues to grow exponentially in the cable network market. In some cable network architectures, including remote physical layer (RPHY) with digital fiber, the coax fiber becomes the bottleneck in throughput, stifling increase in bandwidth. The typical multi-system operator (MSO) is out of options currently, due to the inherent technological limitations of existing cable network components. For example, the Shannon channel capacity limit (e.g., tight upper bound on rate at which information can be reliably transmitted over a communications channel) has practically been achieved already in existing cable network architectures. There is consumer driven demand to extend the frequency spectrum beyond 1.2 GHz, but a conventional extension would require extensive network upgrade. Although technology exists, upgrades in network components are limited by capital expenditure budget limitations, in particular for all optics fiber to the home (FTTH). In such scenarios, it may be desirable to offer new services with full downstream/upstream (DS/US) throughput, e.g., matching Gigabit-capable Passive Optical Networks (GPON) standard of 2.5 Gbits downstream and 1 Gbits upstream with limited capital expenditure for outside plant upgrade.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Numerous interference issues occur at cable modems ("CMs") that support full duplex ("FDX") operations. Such interference issues may result from both the upstream ("US") transmissions of neighboring CMs and US transmissions of the CM itself. The latter will be referred to as self-interference.

Embodiments described herein include techniques for increasing the dynamic range of a full duplex ("FDX") endpoint, including filtering techniques to accomplish that end. Embodiments described herein further include switched filter implementation, shifting the frequencies of the filters so as not to impede the data path, moving filters out of the data path using analog and digital echo cancellation ("EC") and using analog EC for suppressing Adjacent Channel Interference ("ACI") and digital EC for suppressing Adjacent Leakage Interference ("ALI"). Techniques in connection with embodiments described herein may also be applied to wireless communications technologies.

In certain embodiments, there are two techniques that the CM may implement to mitigate self-interference issues, including adding a filter at the receiver to suppress the interferences to maintain receiver dynamic range (reduce the headroom for interference) to mitigate Adjacent Channel Interference ACI and implement EC at the CM to mitigate Adjacent Leakage Interference (ALI).

Example Embodiments

Figure 1:
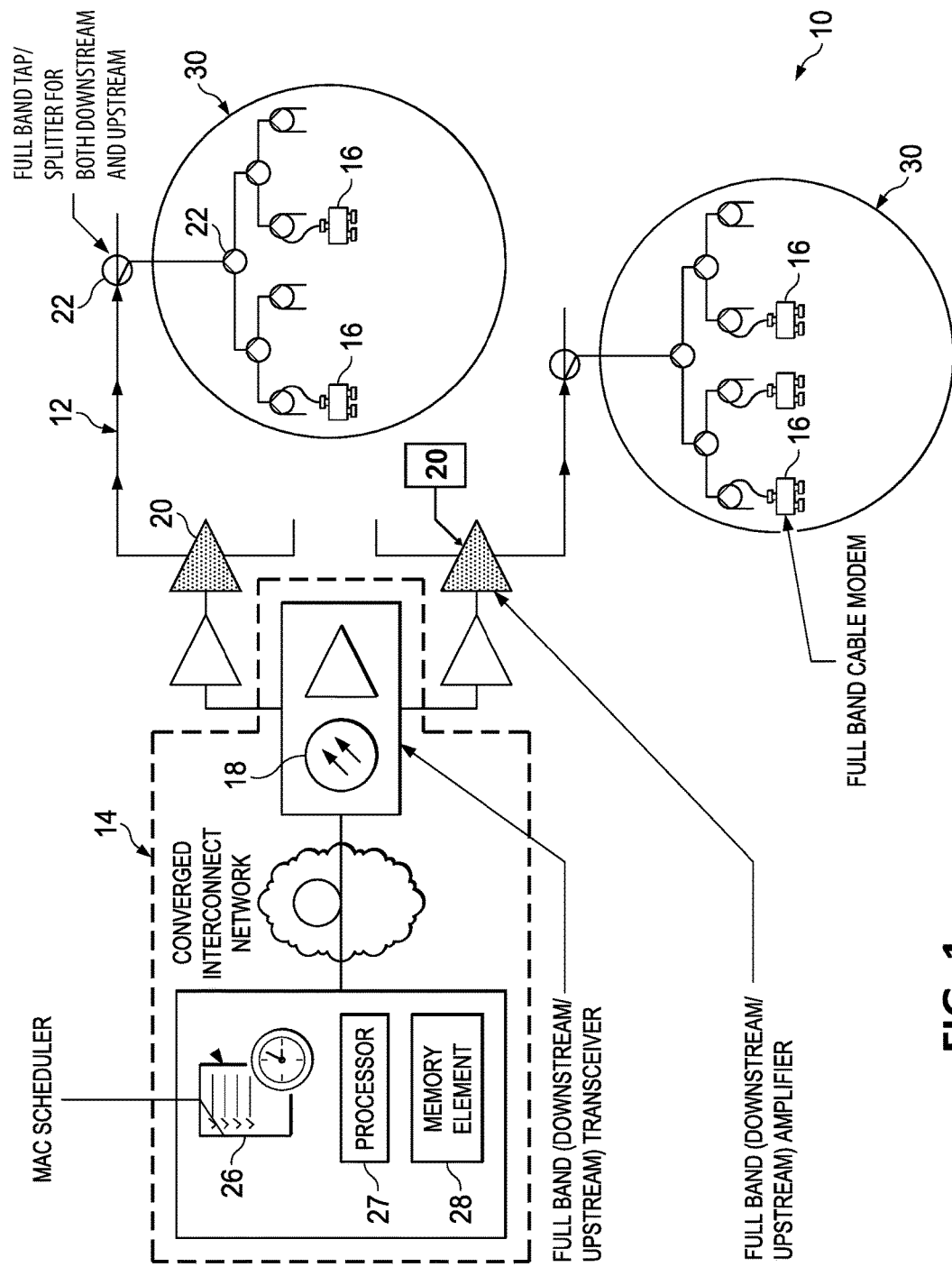
FIG. 1 is a simplified block diagram illustrating a communication system with a full duplex network architecture in cable network environments.

Turning to FIG. 1, FIG. 1 is a simplified block diagram illustrating a communication system 10 enabling full duplex network communication in cable network environments in accordance with one example embodiment. FIG. 1 illustrates a cable network 12 (indicated generally by an arrow) facilitating full duplex communication between a cable modem termination system (CMTS) 14 and one or more cable modems (CMs) 16. Network 12 includes transceivers 18, amplifiers 20, and taps and splitters 22. CMTS 14 includes an intelligent media access control (MAC) scheduler 26 that enables transmission-reception (T-R) coordination for interference avoidance, along with a processor 27 and a memory element 28 that facilitate executing instructions residing in MAC scheduler 26. In various embodiments, cable modems 16 may be grouped into various interference groups 30 to enable full duplex communication with little to no interference. Groups 30 may comprise radio frequency (RF) isolated groups that allow frequency re-use through intelligent MAC scheduling.

Transceivers 18 enable full band communication for both upstream (US) and downstream (DS) network traffic and implement dynamic interference cancellation, also referred to herein as adaptive interference cancellation (AIC). Note that as used herein, the term "upstream" (or US) refers to a communication direction from cable modems 16 towards CMTS 14; the term "downstream" (or DS) refers to a communication direction from CMTS 14 towards cable modems 16. Amplifiers 20 enable full band communication for both upstream and downstream network traffic, and implement AIC with e.g. echo suppression. Taps and splitters 22 may enable full band communication for downstream and upstream traffic.

Each of the cable modems 16 supports full band communication, but operates in simplex mode for upstream or downstream transmission. For example, each of cable modems 16 may be assigned non-overlapping frequency bands for upstream and downstream communication, yet the same set of carriers can be used for the downstream and upstream communication, yielding a doubling of throughput compared to currently existing non-full duplex systems. Communication system 10 can enable higher bandwidth (e.g., bandwidth is the maximum amount of data that can travel through a communication channel) and throughput (e.g., throughput refers to the quantity of data that actually does travel through the communication channel successfully) through full-duplex communication. Various aspects of the communication network 10 and its operation are described in commonly assigned US Patent Application having the publication number 2017/0019146 which is incorporated herein by reference in its entirety.

To explain generally, bandwidth limitations are solved in some communication networks through duplex communication. In a general sense, duplex communication is bidirectional, allowing both end nodes of a communication channel to send and receive data simultaneously and one at a time. Both end nodes have the ability to operate as sender and receiver at the same time, or take turns sending or receiving data. Duplex-based systems typically have dual communication channels that provide separate paths for upstream (US) (e.g., uplink, outgoing, transmitting) and downstream (DS) (e.g., downlink, incoming, receiving) communication. In full duplex mode, the node sends and receives signals simultaneously in the same frequency range.

Examples of communication techniques include frequency division duplexing (FDD) and time division duplexing (TDD). In FDD, separate frequency bands (e.g., carrier frequencies) are used at the transmitter and receiver. Because FDD uses different frequency bands for upstream and downstream operations, the upstream and downstream communication do not interfere with each other.

Full duplex communication mechanisms that are not FDD or TDD have not been used in cable networks, because the inherent network architecture and communication protocols do not support such communication mechanisms. For example, half-duplex cable between CMTS and CMs was first introduced in the United States in the late 1950s. In recent years, cable operators have been investing heavily to upgrade cables from half-duplex to full-duplex as a necessary first step to capitalize on the demand for integrated data and voice services. However, upstream transmissions still continue to have a slower transmission rate than downstream receptions.

Nevertheless, with a properly configured cable network architecture, such as cable network 12 of communication system 10, full duplex communication can drastically expand available upstream spectrum and provide near symmetric downstream and upstream throughput. System capacities (e.g., bandwidth) can improve with full duplex communication. Moreover, full duplex communication may be technology-agnostic and/or standards-agnostic.

However, implementing full duplex in existing cable networks meet with certain challenges. For example, a large transmitted signal coupled back to the receiver due to reflection (e.g., self-interference from the transmit pathway into the receive pathway within one and same transceiver) at any of the network components, including CMTS 14, cable modems 16, transceivers 18, amplifiers 20 and taps and splitters 22, can overwhelm the received signal at the receiver.

Embodiments of communication system 10 can resolve such issues by enabling full duplex communication using appropriately configured components and spectrum sharing techniques. Full duplex communication can be successfully implemented by suppressing (e.g., eliminating) transmitted signals that are coupled back to the receiver (e.g., as an echo, as an upstream signal leaking into the downstream pathway and vice versa, etc.). Sufficient transmitted signal cancellation and/or elimination can be achieved by leveraging (among other parameters) state of the art devices and digital signal processing technologies, high speed and high performance (e.g., high resolution) analog-to-digital converters (ADC), devices with more signal processing capability, an AIC scheme which mitigates Adjacent Channel Interference (ACI) and Adjacent Leakage Interference (ALI), and advanced MAC scheduling for spectrum sharing. In various embodiments, the AIC scheme suppresses at a receiver (for example transceiver 18 or amplifier 20) a signal transmitted by a transmitter (of transceiver 18 or amplifier 20, respectively). Further, in addition to the AIC scheme, full band amplifier 20 may implement echo cancellation (EC).

Interference cancellation can be achieved, for example, through advanced digital signal processing algorithms. Full duplex is independent of cable access technologies and high layer architectures; thus, it can work with any high level protocols and architectures. Full duplex can be used with existing access technology or as a candidate for next generation DOCSIS access technology. Full duplex is novel and substantial, and has business and technology impacts that may go beyond cable access (wireless, for example).

Figure 9:
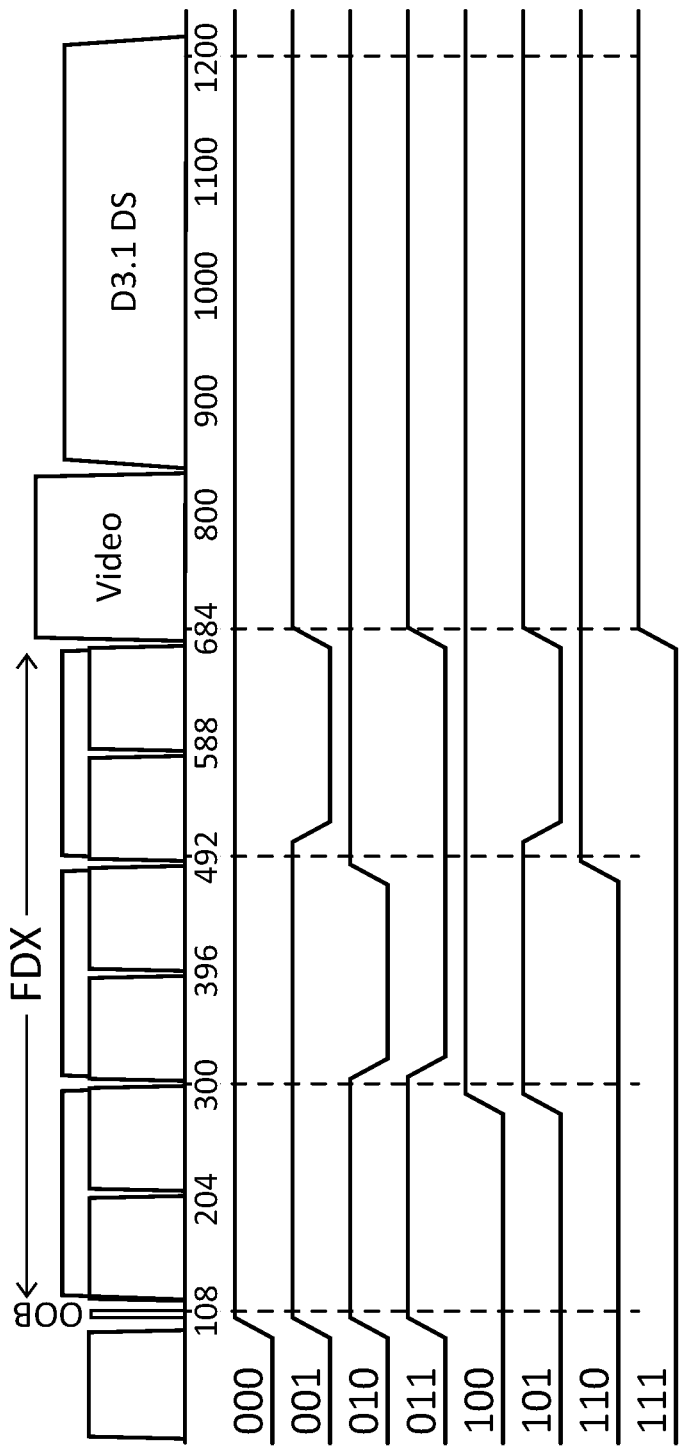
FIG. 9 illustrates an example spectrum allocation for FDX communications.

In an example embodiment, the frequency spectrum of cable network 12 may be divided into multiple frequency ranges (see for example FIG. 9). In some embodiments, each frequency range aligns with a channel boundary. For each specific one of cable modems 16 and each frequency range, MAC scheduler 26 may identify those cable modems 16 whose upstream transmissions interfere with downstream receptions of that specific one of cable modems 16, and those cable modems 16 whose downstream receptions are interfered by upstream transmissions of that specific one of cable modems 16, if they operate on that same frequency. Based on such identification, MAC scheduler 26 avoids assigning cable modems 16 to frequency ranges that may cause interferences among them. Cable modems 16 operate with FDD and no neighboring cable modems 16 are assigned to overlapping downstream and upstream frequency ranges.

Figure 2:
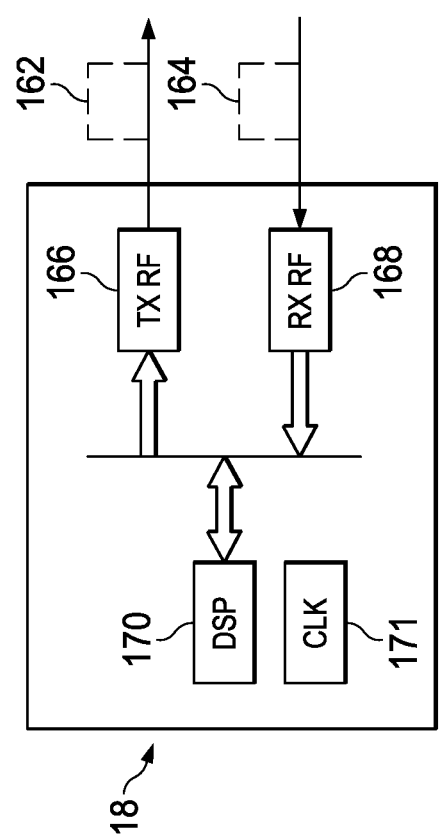
FIG. 2 is a simplified block diagram illustrating example details of embodiments of a cable modem termination system (CMTS) of the communication system.

Turning to FIG. 2, FIG. 2 is a simplified block diagram illustrating example details of transceiver 18 of the CMTS 14 according to an embodiment of communication system 10. In various embodiments, each of downstream and upstream signals uses the complete frequency spectrum during full duplex communication. As a result, a transmitted signal 162 (comprising downstream data from CMTS 14 to cable modems 16) and a received signal 164 (comprising upstream data from cable modems 16 to CMTS 14) overlap in frequency and time at transceiver 18. Typically, transmitted signal 162 has a higher signal level (e.g., with more power) than received signal 164, and can completely overwhelm the received signal 164 if there is insufficient isolation between a transmitter portion 166 and a receiver portion 168 of transceiver 18. In various embodiments, to enable full duplex communication in cable network 12, interferences from transmitter portion 166 may be suppressed at receiver portion 168 using an AIC algorithm implemented in a digital signal processor (DSP) 170 in transceiver 18. DSP 170 includes a memory element for storing instructions and data appropriately. A clock module 171 facilitates timing functions for the AIC algorithm. In various embodiments, clock module 171 may be embedded in DSP 170. DSP 170 may be configured to perform FFT/IFFT (Fast Fourier transform/inverse Fast Fourier transform) or other standard DSP operations. Embedded processors for control operations and I/O operations, with support for floating point operations may also be included in DSP 170. It will be understood, although not explicitly shown in FIG. 2, that a comparable DSP or another processor storing functions of the AIC algorithm may also be incorporated in cable modems 16.

Figure 3:
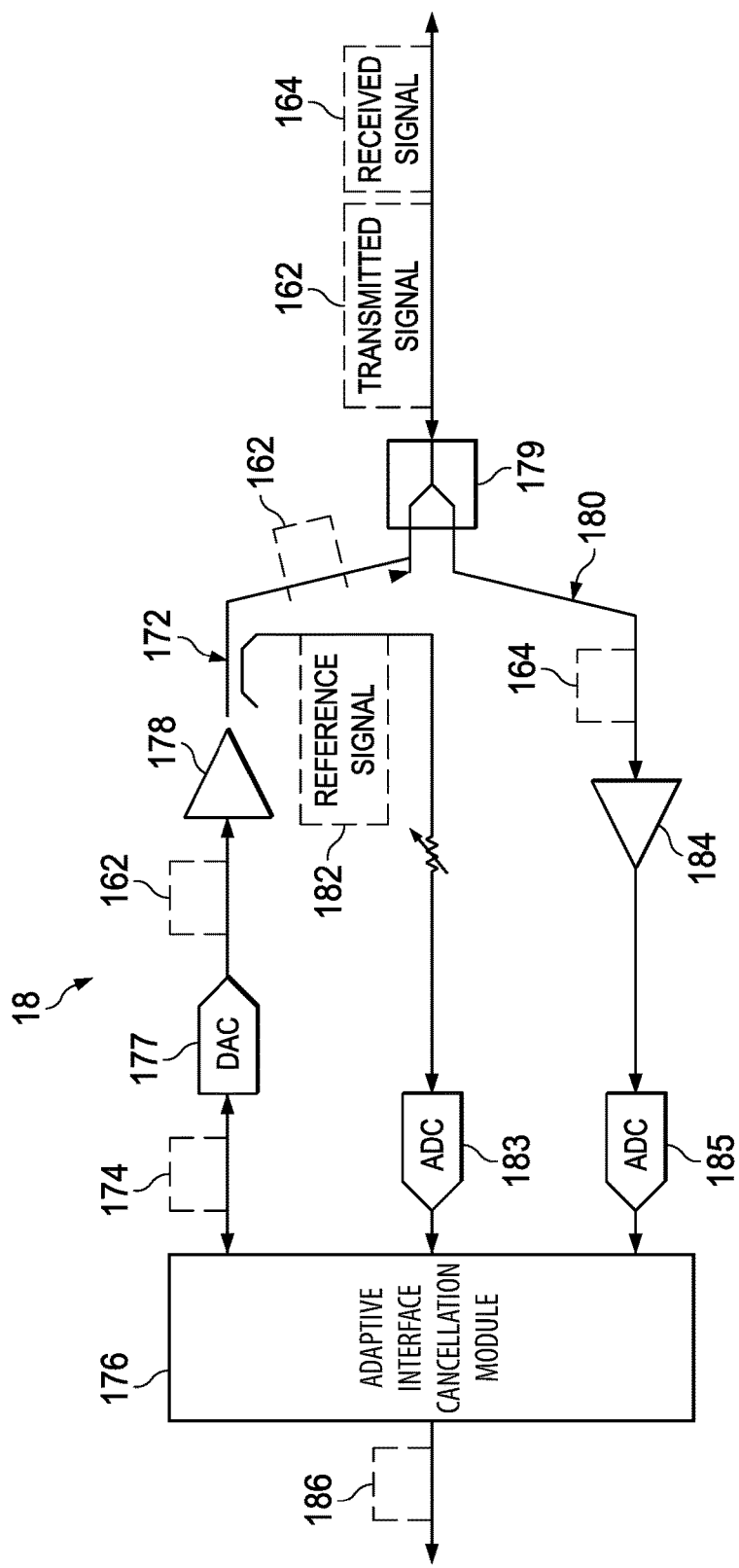
FIG. 3 is a simplified block diagram illustrating another example details of embodiments of the CMTS of the communication system.

Turning to FIG. 3, FIG. 3 illustrates in more detail that downstream signal 162 transmitted from the CMTS may be reflected back to transceiver 18 on an upstream pathway 180 in one or more frequencies that overlap with those of signals in upstream pathway 180 due to full duplex operation. Upstream pathway 180 refers to portions of transceiver 18 that include communication pathway of upstream signals (to CMTS 14 from cable modems 16). Thus, the reflected signal may interfere with another upstream transmission (e.g., from cable modems 16) on upstream pathway 180, generating upstream signal 164, comprising the upstream transmission interfered by the reflected signal. In various embodiments, it may be desirable to extract the upstream transmission without the interferences from the reflected signal. The interactions between the transmitted signal and the reflected signal can be problematic and have to be addressed not only at the CMTS 14, but also at the various modems 16 themselves.

With regard to noise, in Common Channel Interference ("CCI"), a "bad" signal overlaps a "good" signal; in Adjacent Leakage Interference (ALI), a "bad" signal creates a noise floor; and in Adjacent Channel Interference (ACI), a "bad" signal ruins a "good" signal AGC and dynamic range. Currently, the plan is to eliminate CCI with scheduling by MAC scheduler 26 (FIG. 1), eliminate ALI and ACI with filtering, and use filtering to help reduce self and adjacent interference. In accordance with embodiments described herein, ALI may be eliminated with digital EC, and ACI may be eliminated with filtering or analog EC and by refining filtering to allow more scheduling combinations. Embodiments herein focus on self-interference and thus exclude interference caused by other modems.

Figure 4:
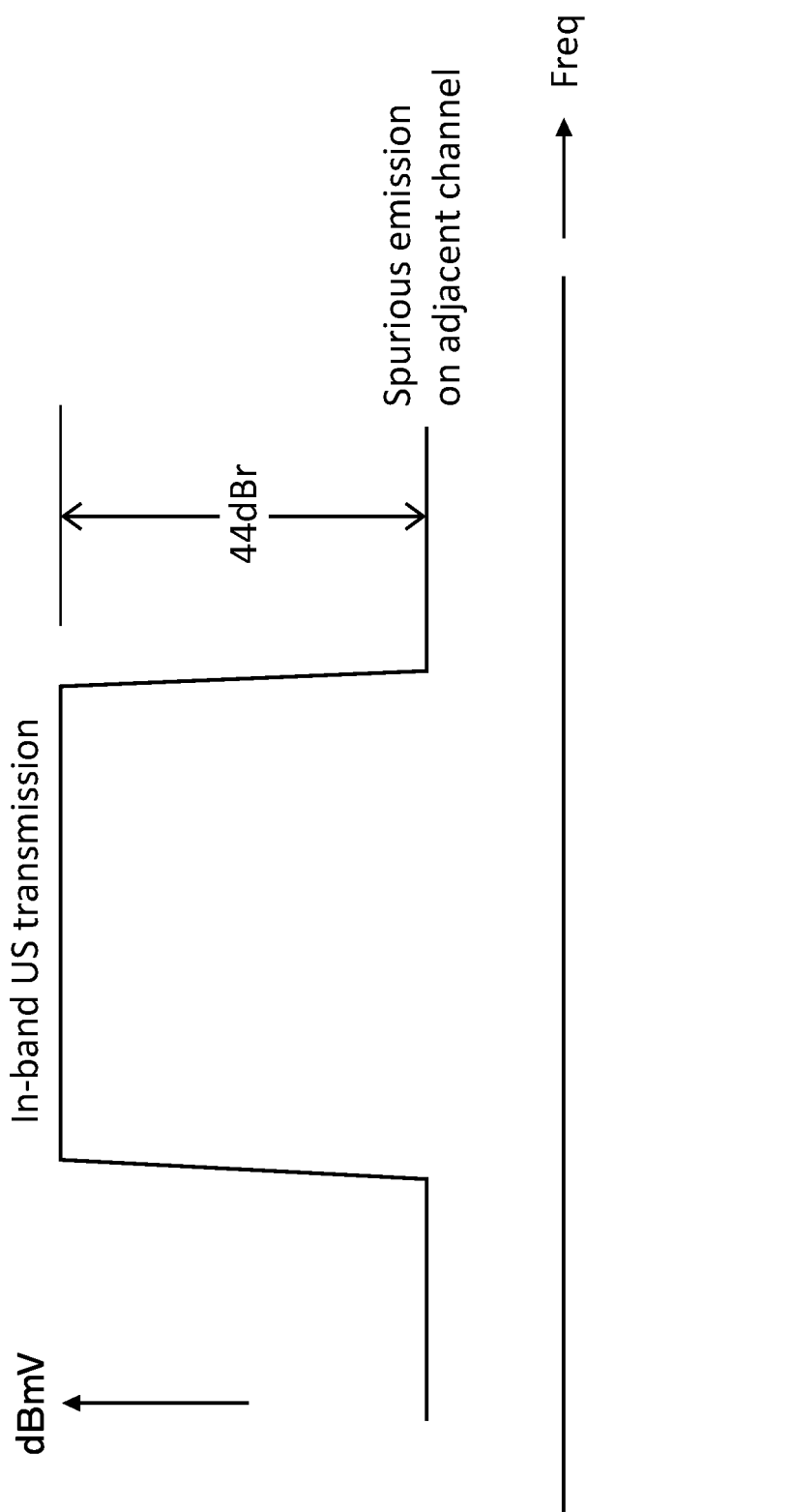
FIG. 4 illustrates D3.1 CM fidelity specifications for adjacent channel spurious emission.

Turning to FIG. 4, current D3.1 CM fidelity specifications require that adjacent channel spurious emission must meet ≈44 dBr with total FDX bandwidth ("BW")=576 MHz. With regard to interference from neighboring CMs, downstream ("DS") reception on an adjacent channel may be impacted by both ACI and ALI, as shown in FIG. 5 and should be mitigated.

In certain embodiments, the CM may implement two techniques to mitigate self-interference issues, including adding a filter at the CM side to suppress the interferences to maintain the dynamic range of the CM receiver (reduce the headroom for interference), in particular the analog-to-digital converters (ADC), to mitigate Adjacent Channel Interference (ACI) and implement EC at the CM to mitigate Adjacent Leakage Interference (ALI). These techniques are illustrated in FIGS. 6 and 7, with FIG. 6 showing a simplified block diagram illustrating echo cancellation (EC) at a CM to mitigate Adjacent Leakage Interference (ALI) issues and FIG. 7 illustrating example signal strengths of self-interference at a CM with receive (RX) filtering of DS signals and echo cancellation.

Figure 6:
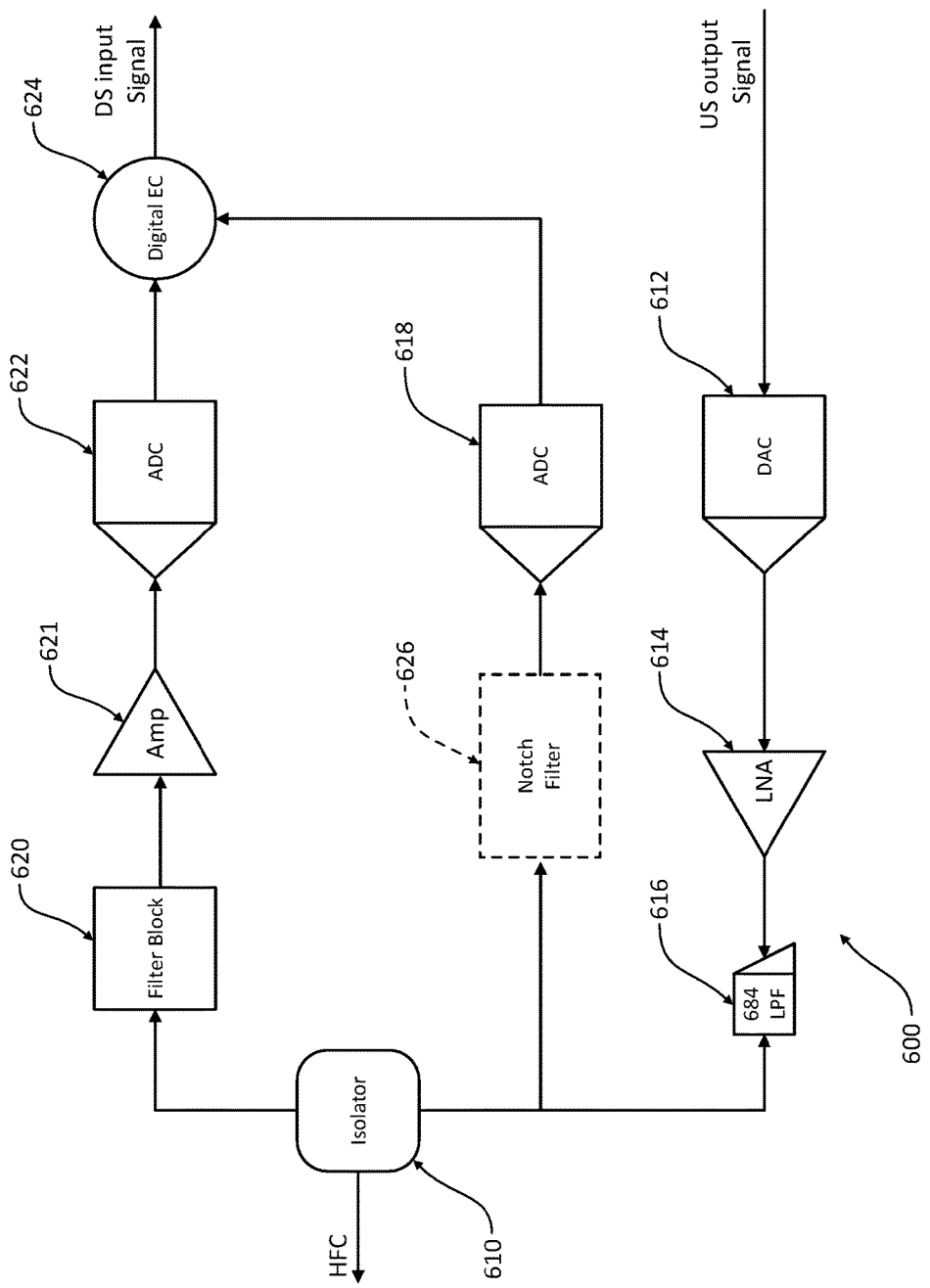
FIG. 6 is a simplified block diagram of a first example embodiment of a circuit echo cancellation (EC) at a CM.
Figure 7:
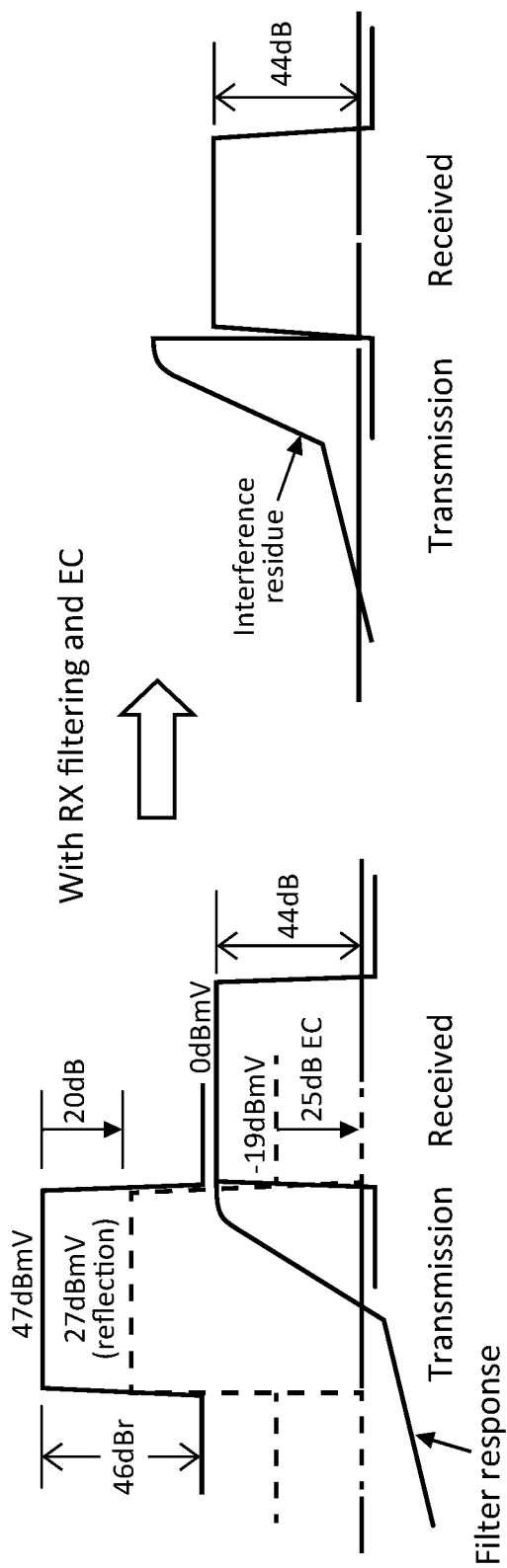
FIG. 7 illustrates self-interference at a CM with receive (RX) filtering and echo cancellation.

Turning now more specifically to FIG. 6, FIG. 6 illustrates a first example embodiment A US signal is transmitted by the CM to a HFC (hybrid fiber coax) and a DS signal is received by the CM from the HFC. The digital US signal is first converted to an analog signal in a digital-to-analog converter (DAC) 612 and modulated on a RF baseband. The RF signal is then amplified by amplifier 614, which may be a low-noise amplifier (LNA), and passed through a low-pass filter (LPF) 616 to limit spurious out-of-band (OOB) signals above the upper limit of 684 MHz for the exemplary FDX frequency band. A conventional isolator 610 provides isolation between the US and DS channels and galvanic isolation between the CM and the HFC. In the illustrated example, the DS signal received from the HFC is filtered by a filter or filter block 620, which may have a switched filter arrangement, which will be described in more detail below in FIGS. 10-12, and which passes frequencies in the transmission band(s) of the DS signal. DS filter or filter block 620 limits ACI by passing the DS signal and removing most of the US signal. The filtered DS signal may then be amplified in amplifier 621 and converted into a digital DS signal in analog-to-digital converter (ADC) 622. To provide echo cancellation, a portion of the US signal modulated on the RF baseband is tapped in the analog US signal path. This tapped signal is then digitized in ADC 618 and provided to a digital EC circuit 624. Before being digitized, the tapped signal may be passed through a notch filter 626 to attenuate the channel(s) in the frequency range of the transmitted US signal. The stop and pass bands, respectively, of the notch filter 626 and the filter block 620 will be described in more detail below with reference to FIG. 10. The digitized DS signal is also provided to the digital EC circuit 624, which performs echo cancellation by suitably subtracting the digitized signal from ADC 618 from the digitized signal from ADC 622. Digital EC 624 limits ALI and may stop around 800 MHz. The functionality of digital echo cancellation and the circuits employed therefor are known in the art and will therefore not be described herein.

Figure 5:
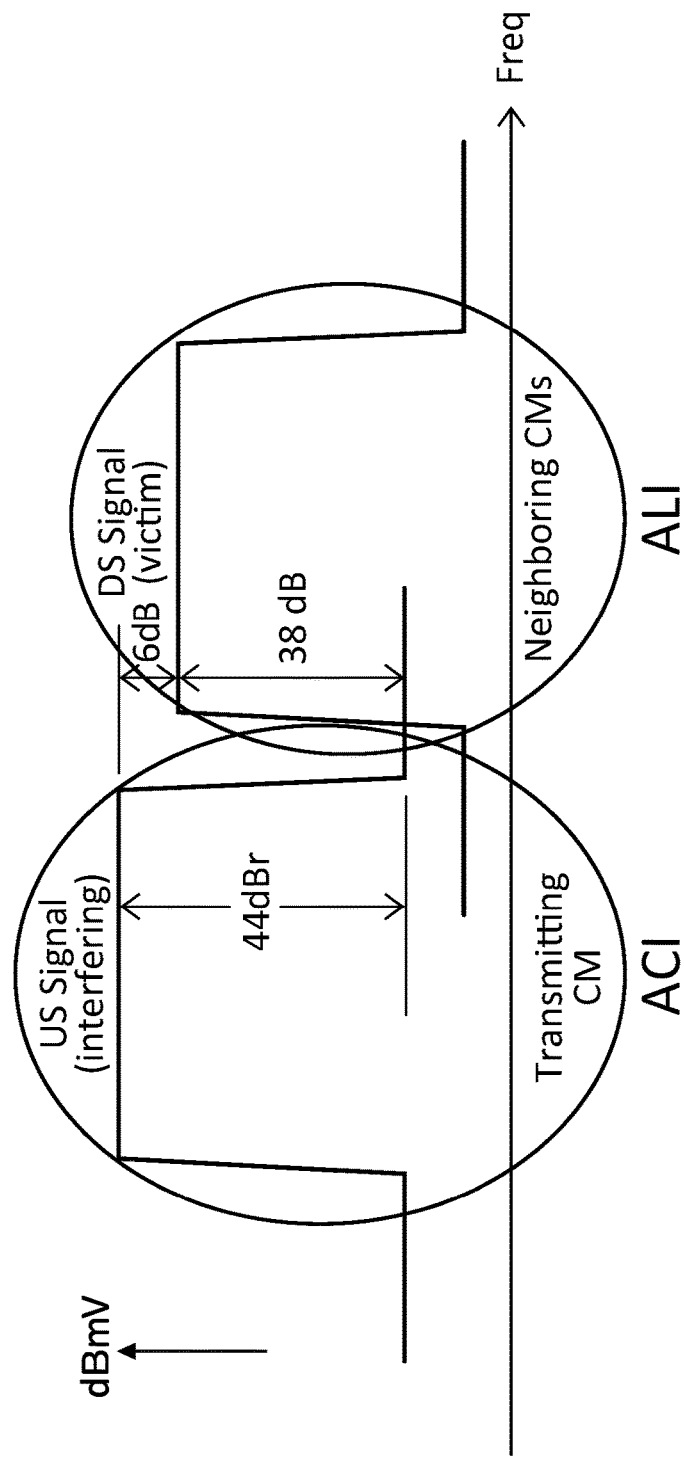
FIG. 5 illustrates self-interference at a CM.

The filters in filter block 620 do not need a fast roll-off, since the filter roll-off regions can be in US bands, as long as the filters sufficiently suppress the US signal to keep the total interference level under a targeted threshold; e.g., 6 dB interference to received signal ratio (see also FIG. 5). The receiver filters in filter block 620 do not cause spectrum loss, as their roll-off regions are in US paths, as illustrated in FIG. 7.

Figure 8:
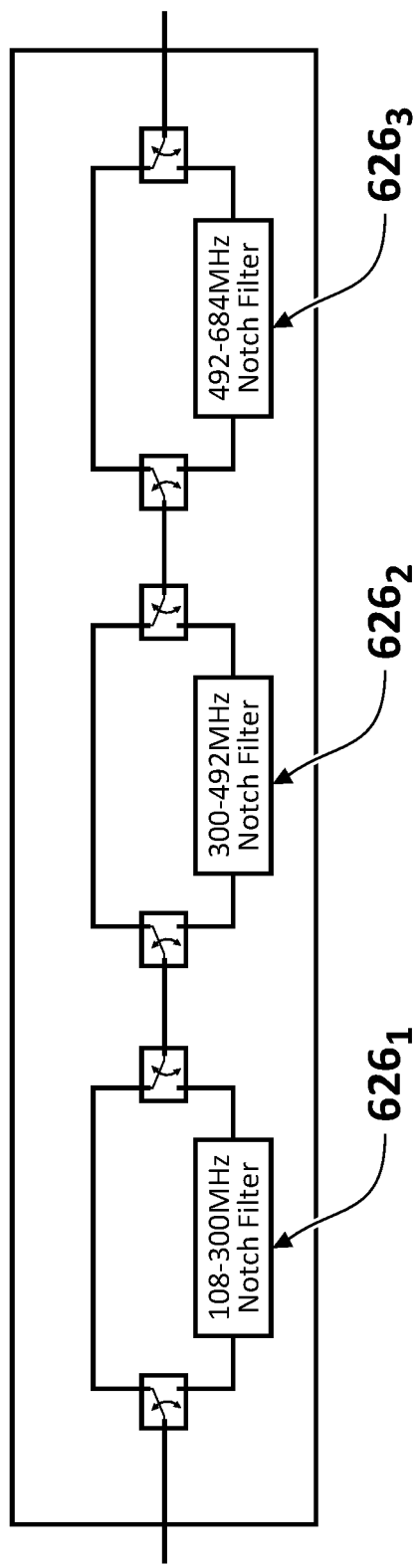
FIG. 8 is a simplified block diagram illustrating notch filters to suppress upstream (US) in-band signals.

The notch filter 626 used to suppress US in-band signals preserves the dynamic range of ADC 618 (i.e., avoids adding ADC noise to the desired DS signal noise floor). The stop band of the notch filter 626 may be selected commensurate with the frequency band for US transmission. Turning now to FIG. 8, FIG. 8 shows an example cascaded arrangement of notch filters $626_1$, $626_2$, $626_3$ having different frequency bands for US transmission, as illustrated in FIG. 9, that can be switched in or out as needed depending on the current US transmission configuration. Stated differently, a filter is switched on only when its notched spectrum or stopband is assigned for US transmission. The losses of the filters and the switches are not of concern, as these filters are not in the CM receive path. The indicated example stopbands are for an example spectrum allocation for FDX communications in the frequency ranges between 108 MHz and 684 MHz to be described below with reference to FIG. 9, but may be adapted to other frequency ranges depending on the overall specification of the communication system 10. Suitable switches capable of operating in frequency ranges from 5 MHz to 6 GHz with insertion losses of 0.3 dB at approximately 1 GHz are commercially available.

Turning now to FIG. 9, FIG. 9 illustrates an example spectrum allocation for FDX communications spanning the frequency range between approximately 108 MHZ and 684 MHz. The exemplary FDX band is subdivided into six frequency channels, each channel extending over approximately 96 MHz. The number-triple on the left-hand side of FIG. 9 refers to adjacent frequency channel pairs which are allocated as follows: A value "1" indicates an upstream (US) channel pair and the value "0" indicates a downstream channel pair. For example, {100} indicates that channels 1 and 2 from 106-300 MHZ are US paths and channels 3 through 6 from 300-684 MHZ are DS paths. Likewise, {110} indicates that channels 1 through 4 from 106-492 MHZ are US paths and channels 5 and 6 from 492-684 MHZ are DS paths. As mentioned above, the channel allocation for FDX operation is merely exemplary and may be extended to other, for example higher frequencies as needed.

Figure 10:
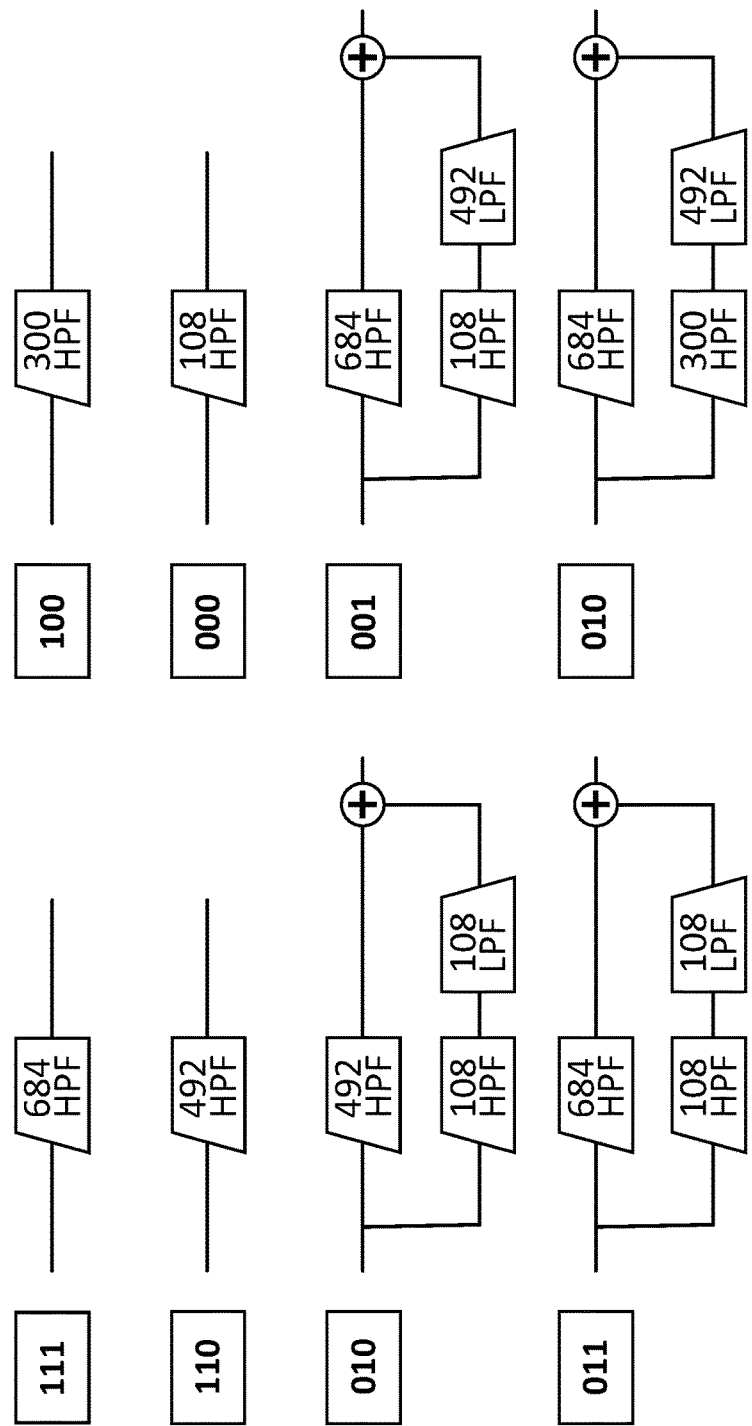
FIG. 10 illustrates eight example combinations of CM downstream (DS) path filters for the FDX bands shown in FIG. 10.

FIG. 10 illustrates filter combinations for eight unique CM DS path filters, which block US frequency bands and pass DS frequency bands. The number-triples shown in FIG. 10 correspond to those in FIG. 9. Accordingly, {100} indicates that channels 3 through 6 from 300-684 MHZ are DS paths, so that any DS signal with a frequency greater than 300 MHz is passed by the 300 MHz HPF. Likewise, {110} indicates that channels 5 and 6 from 492-684 MHZ are DS paths, so that any DS signal with a frequency greater than 492 MHz is passed by the 492 MHz HPF. {010} indicates that channels 1 and 2 from 108 MHz to 300 MHz and channels 5 and 6 from 492-684 MHZ are DS paths, so that any DS signal with a frequency greater than 492 MHz is passed by the 492 MHz HPF and the cascaded 108 MHz HPF and the 300 MHz LPF operate as a 108 MHz-300 MHz bandpass filter for the DS signal.

Figure 11:
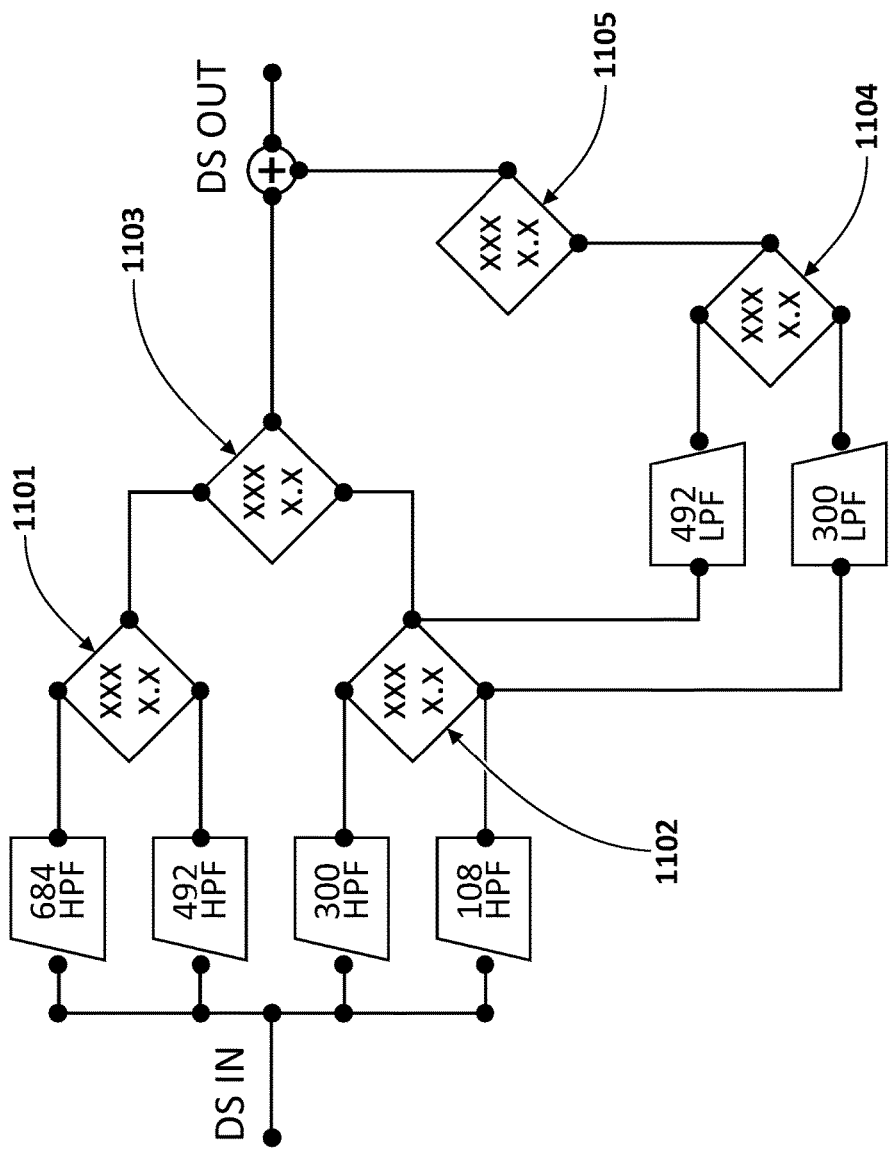
FIG. 11 is a simplified block diagram showing a DS filter block with switchable high-pass (HPF) and low-pass (LPF) filters.

FIG. 11 is a simplified block diagram showing a first embodiment of a switched DS filter block 620. The circuit illustrated in FIG. 11 implements all eight filter combinations shown in FIG. 10, with a total of six filters (4 high-pass filters (HPF) operating at frequencies of 108 MHz, 300 MHz, 492 MHz and 684 MHz, and 2 low-pass filters (LPF) operating at frequencies of 300 MHz and 492 MHz, as well as five RF switches 1101, 1102, 1103, 1104, 1105. The switched DS filter block 620, which has nearly the equivalent complexity and cost of two switching diplexers, is simple and inexpensive to implement.

Suitable RF switches capable of operating in frequency ranges from 5 MHz to 6 GHz with insertion losses of 0.3 dB at approximately 1 GHz are commercially available.

Figure 12:
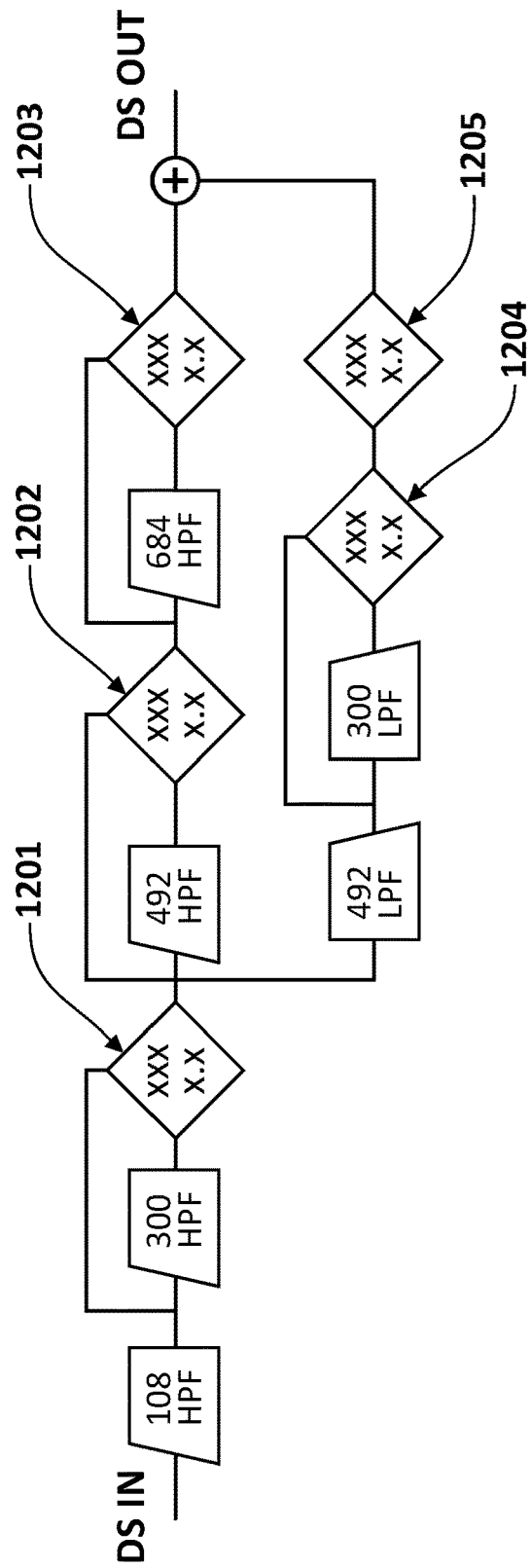
FIG. 12 is a simplified block diagram of an alternative DS filter block with a cascaded arrangement of filters.

FIG. 12 is a simplified block diagram showing a second embodiment of a switched DS filter block 620 with a cascaded arrangement of filters, which are switched in and out by RF switches 1201, 1202, 1203, 1204, 1205. The circuit illustrated in FIG. 12 likewise realizes all eight filter combinations shown in FIG. 10. The roll-off is additive, so that the roll-off at 684 MHz is steeper than the roll-off at 108 MHz. While cascading simplifies each individual filter because lower-Q filters can be used, the overall insertion loss may disadvantageously increase.

Figure 13:
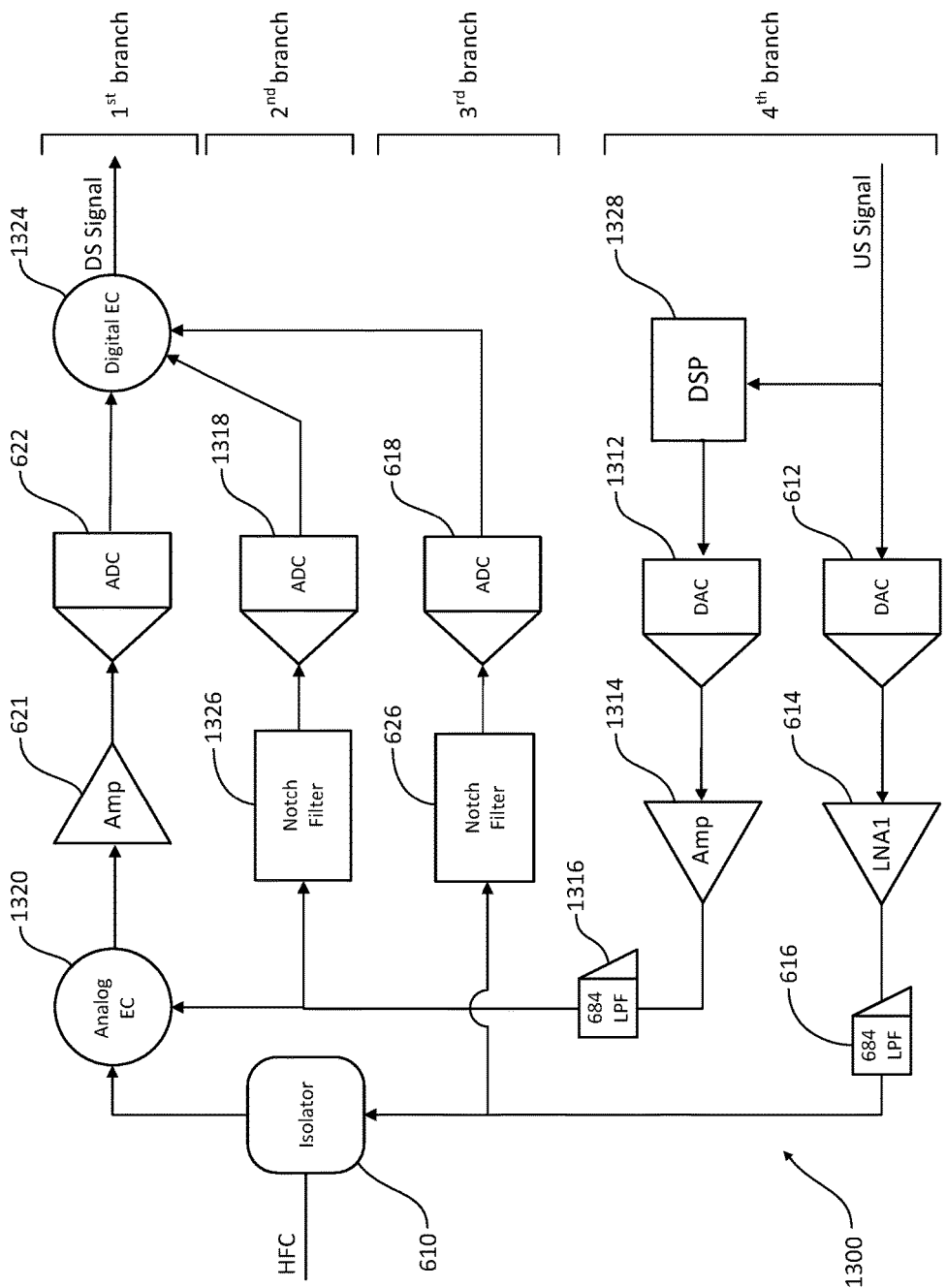
FIG. 13 is a simplified block diagram of a system for providing analog EC with digital assist.

Turning now to FIG. 13, FIG. 13 is a simplified block diagram of a circuit 1300 for providing analog and digital EC. The circuit 1300 can be best understood by partitioning the circuit 1300 into four branches that perform different functions. The $1^{st}$ branch (top) receives the DS signal from the CMTS via the HFC by way of isolator 610, as described above with reference to FIG. 6. The DS signal passes through an analog EC circuit 1320, amplifier 621 and ADC 622 to digital EC circuit 624. The analog EC circuit 1320 performs the role of filter block 620 in the receive (DS signal) path of FIG. 6. In all other aspects, the $1^{st}$ branch is equivalent to the DS signal path of FIG. 6. The lower portion of the $4^{th}$ branch (bottom) transmits the US signal to the CMTS via the HFC by way of isolator 610 and is thus equivalent to the US signal path of FIG. 6.

The analog EC circuit 1320 performs echo cancellation, i.e. limits or suppresses ACI, by subtracting a suitably processed portion of the US signal from the received analog DS signal. DSP 1328 generates from the US signal a 180° out-of-phase signal, which may be delayed and which is then converted to an analog signal in DAC 1312, amplified in amplifier 1314 and low-pass filtered in LPF 1316 to eliminate OOB signals. In this way, signal components of the US signal are substantially eliminated from the signal that is subsequently supplied by the analog EC 1320 to the amplifier 621 and the circuits downstream of the amplifier 621.

Analog EC circuits are known in the art and described, for example, in IEEE Journal of Solid-State Circuits, Vol. 36, No. 3 (2001), pp 366-373. The analog EC circuit 1320 may require a training period which may proceed in two phases. In phase 1, a step is applied and a tap locator circuit calculates the impulse response, identifying the significant taps. In phase 2, random data is applied and a LMS (least-mean-square) algorithm adapts the finite-response (FIR) coefficients to minimize the residual echo. After phase 2, the circuit is ready for full-duplex data communication. There will be some retraining required for the EC coefficients of analog EC circuit 1320 when the channel configuration changes. Hardware variations on filters (notch filter 626 and the filter block 620) will be absorbed by the EC coefficient training.

While the analog EC circuit 1320 can be of simple design and can limit ACI from amplifier 1314 and may also eliminate ALI, a digital EC circuit 1324 may still have to be employed to cancel or at least ameliorate noise and nonlinearities introduced by other electronic circuits of the CM, such as low-noise amplifier 614 and the DACs 612, 1312. The digital EC circuit 1324 limits or suppresses ALI.

In the $2^{nd}$ branch of FIG. 13, the signal supplied by LPF 1316 to the input of the analog EC circuit 1320 is tapped and passed through a notch filter 1326 that blocks signals in the US frequency range. The signal is then digitized in ADC 1318 and supplied to digital EC circuit 1324 in order to remove from the analog-filtered signal any noise and/or nonlinearities introduced in the analog EC circuit 1320 by the DSP 1328, the DAC 1312 and amplifier 1314, which would otherwise impair the DS signal. Notch filter 1326 maintains the dynamic range of the ADC 1318 to keep the noise floor low.

The 3$^{rd}$ branch of FIG. 13 is designed similar to the 2$^{nd}$ branch and includes a notch filter 626 that like notch filter 1326 in the 2$^{nd}$ branch blocks signals in the US frequency range. As in FIG. 6, a portion of the US signal modulated on the RF baseband is tapped at the analog US signal path. This tapped signal is then, as in FIG. 6, passed through the notch filter 626 to attenuate the channel(s) in the frequency range of the RF baseband, digitized in ADC 618 and provided to digital EC circuit 1324. The 3$^{rd}$ branch is employed to cancel echoes originating, for example, from DAC 612 and amplifier 614 in the transmit (US) signal branch.

The analog EC circuit 1320 in the aforedescribed example is designed to operate up to frequencies of 684 MHz. The digital EC circuit operates to approximately 800 MHz. Notch filters maintain good dynamic range on ADCs 618, 1318 to keep the noise floor low. The analog EC circuit 1320 obviates the need for switched filters 620 in the US or DS signal path. DSP/EC coefficient training can absorb manufacturing variations in the filter block 620 in FIG. 6.

Figure 15:
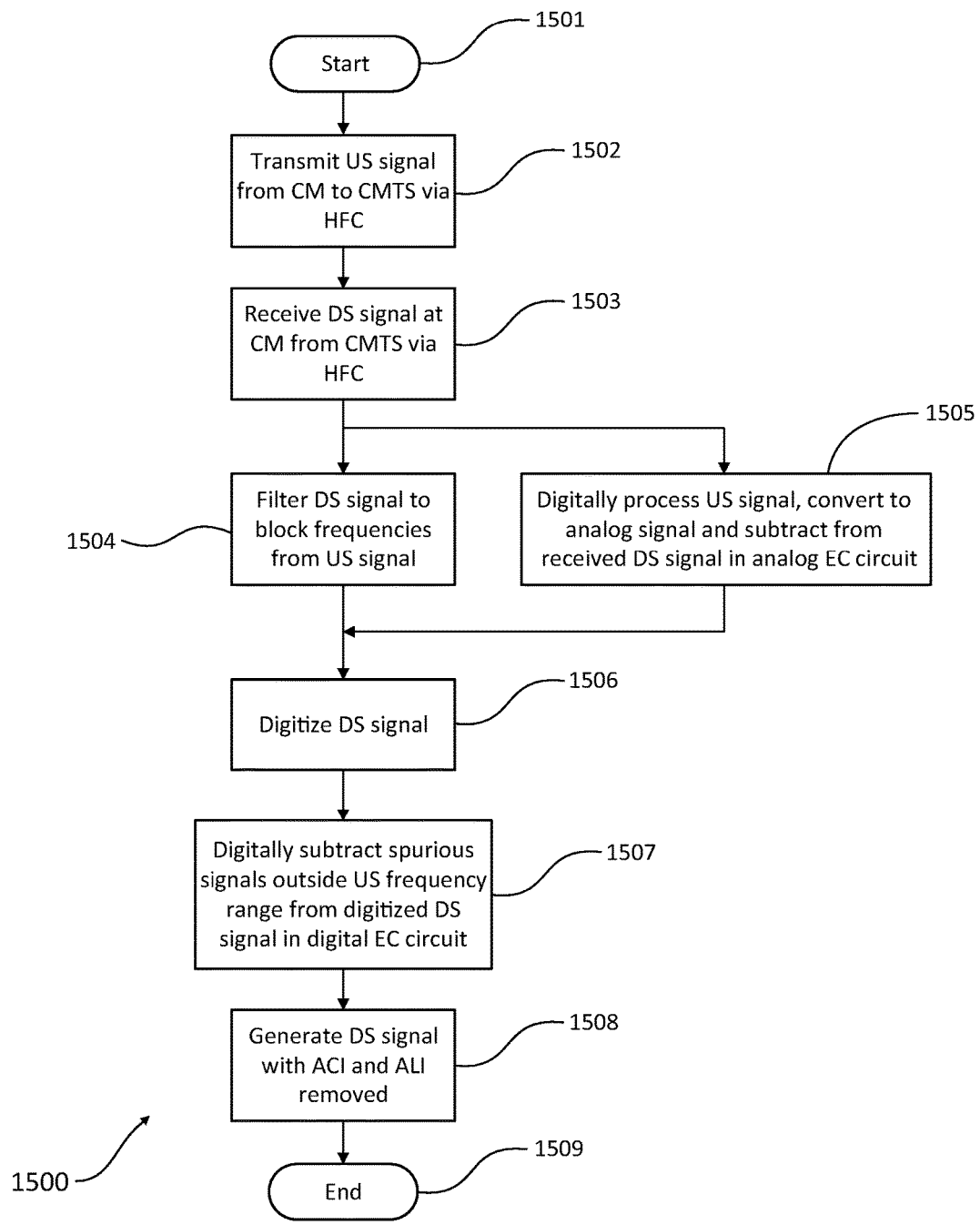
FIG. 15 is a schematic flow diagram depicting processes executed by the systems illustrated in FIGS. 6 and 13.

Turning now to FIG. 15, FIG. 15 is a schematic process flow diagram depicting a process 1500 that employs the systems shown in FIG. 6 and FIG. 13 for limiting or removing ACI and ALI in a CM. The process starts at step 1501, with the CM transmitting, at step 1502, a US signal to the CMTS via the HFC. The CM also receives a DS signal from the CMTS via the HFC, at step 1503. The DS is either filtered to block frequencies in the frequency range of the US signal, at step 1504, as described above with reference to FIG. 6, or subtracts from received DS signal in analog EC circuit one or more digitally processed US signals that have been converted to an analog signal, at step 1505, as described above with reference to FIG. 13. The filtered DS signal or the DS signal outputted by the analog EC circuit, respectively, is then digitized, and spurious signals outside US frequency range are thereafter digitally subtracted from the digitized DS signal in a digital EC circuit, at step 1507. ACI and ALI are thereby limited or suppressed in the output signal generated by the digital EC circuit, at step 1508. The process 1500 ends at step 1509.

Figure 14:
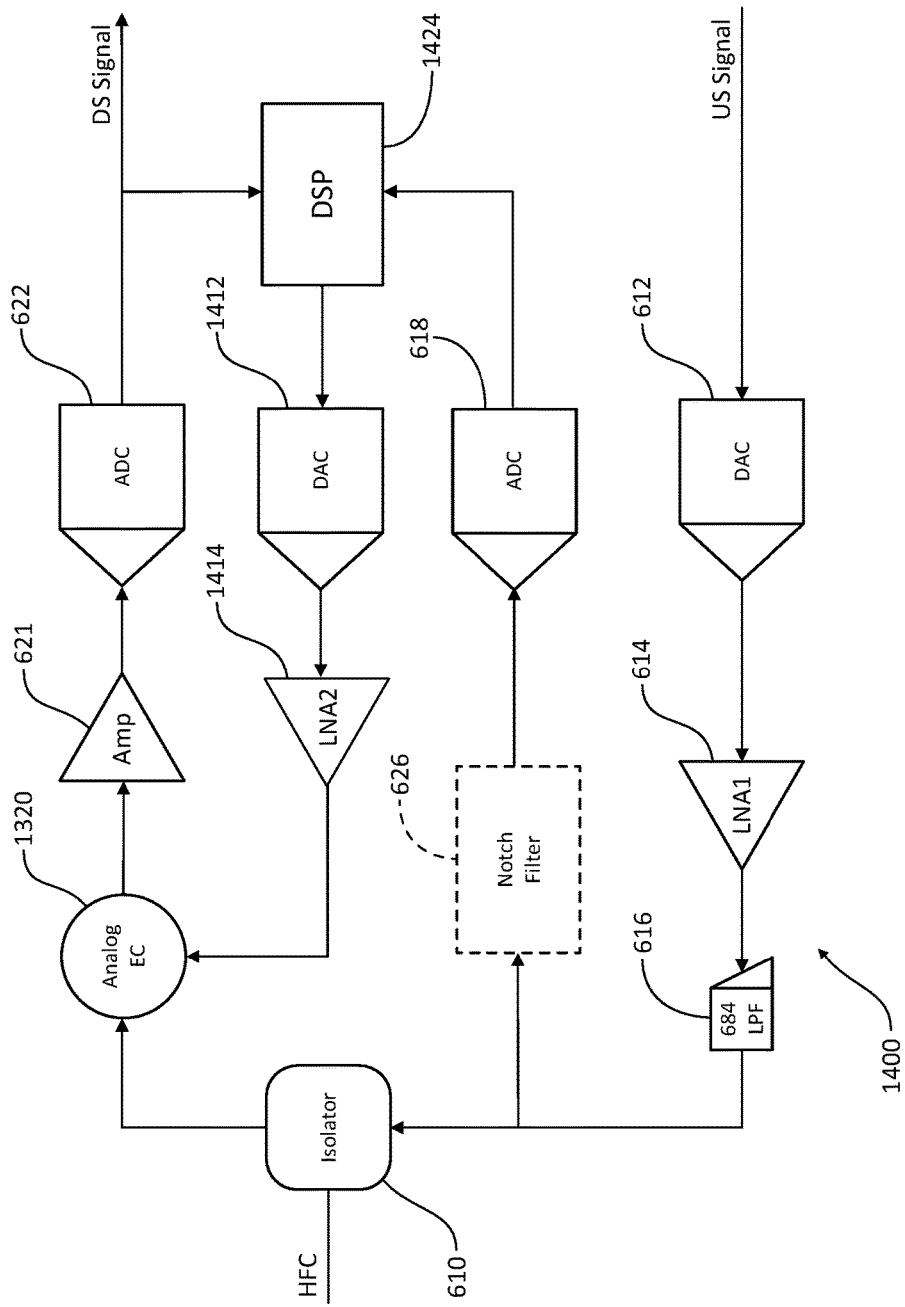
FIG. 14 is a simplified block diagram of a system for providing analog and digital EC.

Turning now to FIG. 14, FIG. 14 illustrates another example embodiment of a circuit 1400 at a CM for EC. Circuit 1400 employs an analog EC circuit 1320 with digital assist from a digital signal processor (DSP) 1424. The path for the US signal includes, as in circuit 600 of FIG. 6, DAC 612, amplifier 614, and LPF 616. LPF 616 in the US signal path limits spurious OOB (out-of-band) signals. Analog EC 1320 cooperates with DSP 1324 to eliminate ACI and ALI originating from amplifier 614.

The DS signal is supplied to analog EC circuit 1320. The output from analog EC circuit 1320 is then amplified in amplifier 621 and converted into a digital DS signal in ADC 622. As in FIGS. 6 and 13, a portion of the low-pass-filtered US signal is tapped at the analog US signal path and optionally passed through a notch filter 626 to attenuate the channel(s) in the frequency range of the transmitted US signal and thereafter digitized in ADC 618. Instead of a digital EC circuit 624 (FIG. 6) or 1324 (FIG. 13), circuit 1400 employs a digital signal processor (DSP) 1424, which receives the digitized output signal from DAC 618 and compares the received digitized output signal with the DS output signal from ADC 622. The DSP 1424 then generates a suitably shaped and/or time-shifted correction signal which is then supplied to DAC 1412, where the correction signal is converted into an analog signal, amplified in amplifier 1414 and subtracted in analog EC circuit 1320 from the received analog DS signal. The coefficients of the DSP 1424 are adjusted until adequate echo cancellation is achieved and ACI and ALI are eliminated or at least limited. The design of circuit 1400 assumes that amplifier 1414 (LNA2) is lower power than amplifier 614 (LAN1) and that spurious OOB from amplifier 1414 is sufficiently small. The design furthermore requires that the dynamic range of the ADCs and DACs is quite high, which may make circuit 1400 less attractive.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In some embodiments, at least some portions of the architectures outlined herein may be implemented in software. In some embodiments, one or more of the described features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, CMTS 14, CM 16, and other components described and shown herein (and/or their associated structures) may also include suitable interfaces for receiving, transmitting, and/or otherwise communicating data or information in a network environment. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 28 in the CMTS or a similar unillustrated memory element in CM 16) may store data used for the operations described herein. Furthermore, the memory element may be able to store instructions (e.g., software, logic, code, etc.) in non-transitory media, such that the instructions are executed to carry out the activities described in this Specification. A processor can execute any type of instructions associated with the data to achieve the operations detailed herein in this Specification. The activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 or CM 16 could be provided in any database, register, table, cache, queue, control list, or storage structure, based on particular needs and implementations, all of which could be referenced in any suitable timeframe.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although communication system 10, HFC and CM's 16 have been illustrated with reference to particular elements and operations that facilitate the communication process, these elements, and operations may be replaced by any suitable architecture or process that achieves the intended functionality of communication system 10, HFC and CM's 16.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant does not intend, by any statement in the specification, to limit this disclosure in any way that is not otherwise reflected in the appended claims.

What is claimed is:

1. A full-duplex cable modem (CM), comprising:
    an upstream (US) signal path receiving a digital US input signal and transmitting an analog-converted US signal in a US frequency range to a cable modem termination system (CMTS), wherein the US signal path comprises a first DAC, a first amplifier, and a first low-pass filter;
    a downstream (DS) signal path receiving an analog DS signal in a DS frequency range and converting the analog DS signal into a digital DS signal, wherein the DS signal path comprises an analog EC circuit receiving the analog DS signal, a second amplifier, a first ADC, and a digital EC circuit wherein,
    the analog EC circuit is configured to subtract from the analog DS signal an analog correction signal derived from the digital US input signal after passing the digital US input signal through a DSP, a second DAC, a second amplifier and a low-pass filter, wherein the analog EC limits ACI, and
    the digital EC circuit configured to subtract from the digital DS signal a first digital echo correction signal generated from the analog-converted US signal which is filtered by a first notch filter to eliminate spurious signals in the US frequency range, and subtracting from the digital DS signal a second digital echo correction signal generated from the analog correction signal which is filtered by a second notch filter to eliminate spurious signals in the US frequency range, wherein the digital EC limits ALI, with the digital EC circuit outputting an echo-cancelled digital DS signal; and
    an echo cancellation (EC) circuit configured to subtract, from at least one of the analog DS signal and the digital DS signal, a correction signal generated from the digital US input signal or from the analog-converted US signal to generate an echo-cancelled digital DS input signal.

2. The full-duplex cable modem of claim 1, wherein the full-duplex cable modem is connected to the CMTS by way of a hybrid fiber coax (HFC).

3. The full-duplex cable modem of claim 2, wherein the HFC is part of a network operating in accordance with a Data Over Cable Service Interface Specification (DOCSIS).

4. The full-duplex cable modem of claim 1, wherein the analog-converted US signal is modulated on a baseband (BB) carrier.

5. The full-duplex cable modem of claim 1, wherein the DS signal path comprises a filter block having switchable filter combinations with one or more pass-bands in the DS frequency range and operates to limit adjacent-channel-interference (ACI).

6. The full-duplex cable modem of claim 1, wherein the EC circuit is implemented as a digital EC circuit and digitally subtracts the correction signal from the digital DS signal to limit Adjacent Leakage Interference (ALI).

7. The full-duplex cable modem of claim 6, further comprising a first notch filter receiving the analog-converted US signal and configured to block signals in the US frequency range before analog-to-digital conversion to a digitized correction signal.

8. The full-duplex cable modem of claim 1, wherein the EC circuit is implemented as an analog EC circuit receiving the analog DS signal, wherein the correction signal is an analog correction signal derived from the digital US input signal and processed in a digital signal processor (DSP), and supplied to the analog EC circuit after digital-to-analog conversion.

9. The full-duplex cable modem of claim 8, further comprising a second notch filter receiving the analog correction signal and configured to block signals in the US frequency range before analog-to-digital conversion of the correction signal to a second digitized correction signal.

10. The full-duplex cable modem of claim 1, wherein the EC circuit is implemented as an analog EC circuit receiving the analog DS signal, wherein the correction signal is derived from the analog-converted US signal and processed in a digital signal processor (DSP), and supplied to the analog EC circuit after digital-to-analog conversion.

11. A method of operating a full-duplex cable modem (CM), the method comprising:
receiving, on an upstream (US) signal path, a digital US input signal and transmitting an analog-converted US signal in a US frequency range to a cable modem termination system (CMTS), wherein the US signal path comprises a first DAC, a first amplifier, and a first low-pass filter;
receiving, on a downstream (DS) signal path, an analog DS signal in a DS frequency range and converting the analog DS signal into a digital DS signal, wherein the DS signal path comprises an analog EC circuit receiving the analog DS signal, a second amplifier, a first ADC, and a digital EC circuit wherein,
the analog EC circuit is configured to subtract from the analog DS signal an analog correction signal derived from the digital US input signal after passing the digital US input signal through a DSP, a second DAC, a second amplifier and a low-pass filter, wherein the analog EC limits ACI, and
the digital EC circuit configured to subtract from the digital DS signal a first digital echo correction signal generated from the analog-converted US signal which is filtered by a first notch filter to eliminate spurious signals in the US frequency range, and subtracting from the digital DS signal a second digital echo correction signal generated from the analog correction signal which is filtered by a second notch filter to eliminate spurious signals in the US frequency range, wherein the digital EC limits ALI, with the digital EC circuit outputting an echo-cancelled digital DS signal; and
subtracting, by an echo cancellation (EC) circuit, from at least one of the analog DS signal and the digital DS signal, a correction signal generated from the digital US input signal or from the analog-converted US signal to generate an echo-cancelled digital DS input signal.

12. The method of claim 11, wherein the full-duplex cable modem is connected to the CMTS by way of a hybrid fiber coax (HFC).

13. The method of claim 12, wherein the HFC is part of a network operating in accordance with a Data Over Cable Service Interface Specification (DOCSIS).

14. The method of claim 11, wherein the analog-converted US signal is modulated on a baseband (BB) carrier.

15. The method of claim 11, wherein the DS signal path comprises a filter block having switchable filter combinations with one or more pass-bands in the DS frequency range and operates to limit adjacent-channel-interference (ACI).

16. The method of claim 11, wherein the EC circuit is implemented as a digital EC circuit and digitally subtracts the correction signal from the digital DS signal to limit Adjacent Leakage Interference (ALI).

17. The method of claim 16, further comprising a first notch filter receiving the analog-converted US signal and configured to block signals in the US frequency range before analog-to-digital conversion to a digitized correction signal.

18. The method of claim 11, wherein the EC circuit is implemented as an analog EC circuit receiving the analog DS signal, wherein the correction signal is an analog correction signal derived from the digital US input signal and processed in a digital signal processor (DSP), and supplied to the analog EC circuit after digital-to-analog conversion.

19. The method of claim 18, further comprising a second notch filter receiving the analog correction signal and configured to block signals in the US frequency range before analog-to-digital conversion of the correction signal to a second digitized correction signal.

20. The method of claim 11, wherein the EC circuit is implemented as an analog EC circuit receiving the analog DS signal, wherein the correction signal is derived from the analog-converted US signal and processed in a digital signal processor (DSP), and supplied to the analog EC circuit after digital-to-analog conversion.

* * * * *